United States Patent
Li et al.

(10) Patent No.: US 10,570,301 B2
(45) Date of Patent: Feb. 25, 2020

(54) SOLVENT BASED INKJET INK COMPOSITION

(71) Applicant: Inner Mongolia Xianhong Science Co. Ltd, Hohhot, Inner Mongolia (CN)

(72) Inventors: Pei Li, Hong Kong (CN); Kin Man Ho, Hong Kong (CN); Chun Ho Yam, Hong Kong (CN); Siu Sun Chan, Hong Kong (CN); Kwai Sang Ng, Hong Kong (CN)

(73) Assignee: INNER MONGOLIA XIANHONG SCIENCE CO., LTD., Hohhot, Inner Mongolia (CN)

( * ) Notice: Subject to any disclaimer, the term of this patent is extended or adjusted under 35 U.S.C. 154(b) by 0 days.

(21) Appl. No.: 15/828,368

(22) Filed: Nov. 30, 2017

(65) Prior Publication Data

US 2018/0155561 A1 Jun. 7, 2018

Related U.S. Application Data

(60) Provisional application No. 62/429,082, filed on Dec. 2, 2016.

(51) Int. Cl.
| | | |
|---|---|---|
| *C09D 11/322* | (2014.01) | |
| *C09D 11/36* | (2014.01) | |
| *C09D 11/38* | (2014.01) | |
| *C01G 49/02* | (2006.01) | |
| *C09C 3/12* | (2006.01) | |
| *B82Y 30/00* | (2011.01) | |
| *B82Y 40/00* | (2011.01) | |

(52) U.S. Cl.
CPC ............ *C09D 11/322* (2013.01); *C01G 49/02* (2013.01); *C09D 11/36* (2013.01); *C09D 11/38* (2013.01); *B82Y 30/00* (2013.01); *B82Y 40/00* (2013.01); *C01P 2004/64* (2013.01); *C01P 2006/42* (2013.01); *C09C 3/12* (2013.01)

(58) Field of Classification Search
CPC ................................ C09D 11/30; C09D 11/52
See application file for complete search history.

(56) References Cited

U.S. PATENT DOCUMENTS

| | | | |
|---|---|---|---|
| 4,919,727 A | 4/1990 | Burow et al. | |
| 5,273,575 A | 12/1993 | de Saint Romain | |
| 5,401,313 A | 3/1995 | Supplee et al. | |
| 5,443,628 A | 8/1995 | Loria et al. | |
| 5,843,525 A | 12/1998 | Shibasaki et al. | |
| 5,858,595 A | 1/1999 | Ziolo | |
| 5,900,899 A | 5/1999 | Ichizawa et al. | |
| 5,948,155 A | 9/1999 | Yui et al. | |
| 5,977,207 A | 11/1999 | Yui et al. | |
| 6,099,895 A | 8/2000 | Mayo et al. | |
| 6,139,946 A | 10/2000 | Carlson et al. | |
| 6,139,966 A | 10/2000 | Carlson et al. | |
| 6,499,839 B1 * | 12/2002 | Busby .................. | B41J 2/175 347/100 |
| 6,974,493 B2 | 12/2005 | Harutyunyan et al. | |
| 7,344,587 B2 | 3/2008 | Khan et al. | |
| 8,303,838 B2 | 11/2012 | Iftime et al. | |
| 8,360,546 B2 | 1/2013 | Iftime et al. | |
| 8,404,347 B2 | 3/2013 | Li et al. | |
| 8,409,341 B2 * | 4/2013 | Iftime .................. | H01F 1/0054 106/31.6 |
| 8,544,999 B2 | 10/2013 | Iftime et al. | |
| 8,597,420 B2 | 12/2013 | Iftime et al. | |
| 8,646,896 B2 | 2/2014 | Iftime et al. | |
| 8,657,431 B2 | 2/2014 | Iftime et al. | |
| 8,702,217 B2 | 4/2014 | Iftime et al. | |
| 9,067,782 B2 | 6/2015 | Baran et al. | |
| 9,328,251 B2 | 5/2016 | Iftime et al. | |
| 2010/0279118 A1 | 11/2010 | Hempenius | |
| 2012/0062661 A1 * | 3/2012 | Oriakhi ................ | C09D 5/36 347/85 |
| 2015/0056426 A1 | 2/2015 | Grouchko et al. | |
| 2015/0314936 A1 | 11/2015 | Stack, Jr. | |

FOREIGN PATENT DOCUMENTS

| | | |
|---|---|---|
| CA | 2770959 A1 | 9/2012 |
| EP | 0379674 A2 | 8/1990 |
| EP | 0572314 A1 | 12/1993 |
| EP | 1840178 A1 | 10/2007 |
| WO | 1992015648 A1 | 9/1992 |
| WO | 9851749 A1 | 11/1998 |

* cited by examiner

*Primary Examiner* — Veronica F Faison
(74) *Attorney, Agent, or Firm* — Squire Patton Boggs (US) LLP

(57) ABSTRACT

Provided herein is an inkjet ink composition comprising an ink solvent, a binder, an additive, and a colorant comprising superparamagnetic or/and paramagnetic surface-modified iron oxide or/and iron hydroxide nanoparticles, wherein the nanoparticles are coated with a layer of silica-based coating or/and a layer of functional polymer. The superparamagnetic property of the nanoparticles ensures no magnetic attraction between the nanoparticles at room temperature, and good dispersion stability in the inkjet ink composition. The inkjet ink composition disclosed herein has excellent printing stability in terms of no flocculation and clogging of nozzle during inkjet printing and shows comparable printing stability with non-pigment ink. Printing on nonporous substrates with the inkjet ink composition disclosed herein has excellent transfer resistance. The inkjet ink composition disclosed herein allows color tuning of the ink through controlling the crystal structures of the nanoparticles.

24 Claims, No Drawings

SOLVENT BASED INKJET INK COMPOSITION

CROSS-REFERENCE TO RELATED APPLICATIONS

This application claims the benefit of U.S. provisional application No. 62/429,082, filed Dec. 2, 2016, the content of which is hereby incorporated by reference in its entirety.

FIELD OF THE INVENTION

This invention relates to an inkjet ink composition comprising a binder, an ink solvent, one or more optional additives, and a colorant comprising surface-modified iron oxide or/and iron hydroxide nanoparticles having superparamagnetic or/and paramagnetic property.

BACKGROUND OF THE INVENTION

When prints are produced through printing by an inkjet printer using an inkjet ink composition comprising carbon black as a colorant, the printer nozzle is often clogged arising from poor dispersion of carbon black in the inkjet composition, thereby resulting in poor print quality. Various attempts have been made to prepare aggregation-free carbon black inkjet ink compositions. Some examples of aqueous-based carbon black inkjet ink compositions include those disclosed in U.S. Pat. Nos. 5,571,311 A, 4,530,961, 5,085,698, U.S. Pat. No. 20040123773 A1, U.S. Pat. No. 6,328,393 B1, European Pat. No. EP1887058 A1, and European Pat. No. EP2290021 A1.

For solvent-based inkjet ink system, U.S. Pat. Appl. No. 2013/0030099A1 has disclosed a carbon black ink composition containing an alkane nitrile and a solvent selected from the group consisting of methyl ethyl ketone and cyclohexanone to prevent carbon black from forming intact structure. As a result, a good dispersion could be obtained.

U.S. Pat. No. 8,586,656 B2 has disclosed a particular inkjet ink composition, which provides a good dispersion stability of the carbon black. It comprises a combination of solvent mixture, a pigment, a binder resin, a pigment dispersant, and a solvent, wherein in the solvent is formed of (1) at least one glycol ether and at least one of a lactone compound and 2-pyrrolidone, or (2) at least one glycol ether acetate and at least one of cyclohexane and isophorone. However, the use of large amounts of non-polar solvents leads to low ink conductivity due to their low dielectric constant, thereby limiting their applicability in a continuous inkjet printer.

All of the inkjet ink compositions disclosed by the above patents mainly studied the effect of solvent combinations on dispersion of carbon black in solvents to enhance its dispersion stability. Despite of the success of their approaches, carbon black-based inks often suffer from poor printing reliability in a continuous inkjet printer because the electrically conducting carbon black easily forms an insoluble conductive film on high voltage deflection plates in the printer in the presence of electric field. The insoluble film increases its thickness over time, forming compact film, and finally leading to printing failure. As a result, a special cleaning solution is required to wash the insoluble film.

To prevent insoluble films formed on the print head of the continuous inkjet printer, U.S. Pat. Appl. No. 2013/0027478 has disclosed an ink composition comprising an organic solvent, a binder, and a colorant which is selected from at least two colors of pigments with or without carbon black to produce black colored inkjet ink. It is claimed that reducing or having no carbon black in the formulation can significantly improve the printing stability. However, there is a major concern about color separation because each color of pigment may have different dispersion stability in a particular solvent system.

Some conventional pigment ink compositions comprise a black colored iron oxide pigment particles, a binder, a solvent or solvent mixture, such as those disclosed in European Pat. No. 1840178 A1, U.S. Pat. No. 8,303,838 B2, Canadian Pat. No. 2,770,959 A1, U.S. Pat. No. 8,597,420 B2. However, all of such conventional ink compositions require high energy and time-consuming grinding process to disperse the iron oxide pigment in the solvent. Furthermore, serious sedimentation of the iron oxide pigment in ink formulation often occurs due to its high density.

All of the conventional ink compositions have never used a bottom up process for making surface-modified iron oxide or iron hydroxide nanoparticle as a colorant. In particular, no prior art documents have disclosed ink compositions that contain a superparamagnetic iron oxide or/and iron hydroxide nanoparticle as a colorant to provide excellent printing stability. Furthermore, no prior art documents have disclosed the use of magnetite nanoparticles as an alternative to carbon black in making ink compositions. In addition, no prior art documents have disclosed tuning ink color to, for example, yellow, red, brown and black by varying the crystal structures of the iron oxide or/and iron hydroxide crystals.

Therefore, there is a need for overcoming the disadvantages and problems mentioned above. The present invention overcomes the problems associated with prior arts as mentioned above.

SUMMARY OF THE INVENTION

The aforementioned problems are resolved by various aspects and embodiments disclosed herein. In one aspect, provided herein is an inkjet ink composition comprising:

a) a colorant comprising surface-modified nanoparticles, wherein the surface-modified nanoparticles exhibit superparamagnetic or/and paramagnetic property at room temperature, and wherein the surface-modified nanoparticles are coated with a layer of silica layer, a layer of a functional polymer, or a combination thereof;

b) an ink solvent;

c) a binder or binder resin; and d) one or more optional additive.

In some embodiments, the surface-modified nanoparticles comprise surface-modified iron oxide nanoparticles, surface-modified iron hydroxide nanoparticles or a combination thereof. In certain embodiments, the surface-modified nanoparticles comprise surface-modified iron oxide nanoparticles. In other embodiments, the surface-modified nanoparticles comprise superparamagnetic surface-modified magnetite or maghemite nanoparticles or a combination thereof.

In certain embodiments, the surface-modified nanoparticles are made from a bottom-up synthesis. In some embodiments, the average diameter of the surface-modified nanoparticles is from about 1 nm to about 150 nm or from about 1 nm to about 90 nm. In other embodiments, the average diameter of the surface-modified nanoparticles is less than about 90 nm, less than about 80 nm, or less than about 50 nm.

In some embodiments, the functional polymer functions as a stabilizer or a binder or a combination thereof.

In certain embodiments, the colorant is present in an amount from about 0.1% to about 30% or from about 1% to about 30% by weight, based on the total weight of the inkjet ink composition.

In some embodiments, the ink solvent is selected from the group consisting of ketones, alcohols, esters, and combinations thereof. In certain embodiments, the ink solvent comprises a mixture of methyl ethyl ketone, ethyl acetate and ethanol. In other embodiments, the ink solvent is present in an amount from about 50% to about 85% by weight, or from about 65% to about 80% by weight, based on the total weight of the inkjet ink composition.

In certain embodiments, the binder or binder resin is present in an amount from about 0.1% to about 35% by weight, based on the total weight of the inkjet ink composition.

In some embodiments, the additive is selected from the group consisting of plasticizers, surfactants, light stabilizers, defoaming agents, antioxidants, UV stabilizers, bactericides, conducting agents, rub resistant agents, and combinations thereof. In other embodiments, the additive comprises one or more plasticizers for solubilizing the binder.

In certain embodiments, the inkjet ink composition does not flocculate during inkjet printing.

In some embodiments, a print formed on a first nonporous substrate by the inkjet ink composition is not substantially transferred to a second nonporous substrate after the first nonporous substrate and the second nonporous substrate with the print between the first and second substrates are bundled by wrapping with a polyethylene wrap and then pressed under a load of 500 g at 50° C. for 24 hours. In other embodiments, the amount of the print transferred from the first nonporous substrate to the second nonporous substrate is less than 1% of the print by weight or area after the first nonporous substrate and the second nonporous substrate with the print between the first and second substrates are bundled by wrapping with a polyethylene wrap and then pressed under a load of 500 g at 50° C. for 24 hours.

In certain embodiments, each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

In some embodiments, the crystal structure of the surface-modified nanoparticles is adjustable to display black, brown, yellow or red color.

In another aspect, provided herein is a method of making the surface-modified iron oxide or/and iron hydroxide nanoparticles disclosed herein. In some embodiments, the surface-modified iron oxide or/and iron hydroxide nanoparticles are produced through a bottom-up synthesis comprising the steps of:

a) forming iron oxide or/and iron hydroxide nanoparticles from a solution of iron salts in the presence of one or more functional polymers;

b) reacting a silanol precursor with the surface of functional groups of the iron oxide or/and iron hydroxide nanoparticles via;

i) hydrolyzing the silanol precursor to form a silanol; and ii) condensing the silanol onto the surface of iron oxide or/and iron hydroxide nanoparticles to form silica-coated iron oxide or/and iron hydroxide nanoparticles; and c) hydrolyzing and condensing a silane coupling agent onto silica-coated nanoparticles to form siloxane polymer coating.

DETAILED DESCRIPTION OF THE INVENTION

General Definitions

The term "nanoparticles" refers to particles that are in the form of a single nanoparticle or a nanoparticle cluster between 1 nm and 150 nm in size or diameter.

The term "iron oxide nanoparticles" in an ink composition disclosed herein refers to nanoparticles that comprise one or more iron oxides. Some non-limiting examples of iron oxide nanoparticles include magnetite ($Fe_3O_4$), maghemite ($\gamma$-$Fe_2O_3$) and hematite ($\alpha$-$Fe_2O_3$), or a combination thereof.

The term "iron hydroxide nanoparticles" in an ink composition disclosed herein refers to nanoparticles that comprise one or more iron hydroxides. Some non-limiting examples of iron hydroxide nanoparticles include ferrihydrite ($2FeOOH \cdot 2.6H_2O$), goethite ($\alpha$-$FeO(OH)$), akaganeite ($\beta$-$FeOOH$), and lepidocrocite ($\gamma$-$FeO(OH)$) or a combination thereof.

The term "surface-modified iron oxide nanoparticles" in an ink composition disclosed herein refers to the iron oxide nanoparticles coated with a layer of a silica-based coating, a layer of a functional polymer or stabilizer, or a combination thereof. In some embodiments, the iron oxide nanoparticles are coated with a layer of silica or siloxane polymer or a functional polymer or a combination thereof.

The term "surface-modified iron hydroxide nanoparticles" in an ink composition disclosed herein refers to iron hydroxide nanoparticles coated with a layer of silica-based coating, a layer of a functional polymer or stabilizer, or a combination thereof. In some embodiments, the iron hydroxide nanoparticles are coated with a layer of silica or siloxane polymer or a functional polymer or a combination thereof.

The term "polymer" disclosed herein refers a polymeric compound prepared by polymerizing monomers or derived from 2 or more molecules of monomers, whether of the same or a different type. The generic term "polymer" embraces the terms "homopolymer," "copolymer," "terpolymer" as well as "interpolymer." In some embodiments, the polymer is derived from more than 1, 2, 3, 4, 5, 10, 15 or 20 molecules of one or more monomers and/or one or more co-monomers.

The term "functional polymer" disclosed herein refers to an organic polymer comprising at least one functional or polar group pendant from the polymer backbone that help disperse the surface-modified nanoparticles disclosed herein. In some embodiments, the functional or polar group is quaternary ammonium, hydroxy, an acid group (e.g., salts or acids based on sulfate, salts or acids based on sulfonate, salts or acids based on phosphate, salts or acids based on phosphonate, salts or acids based on carboxyl), a basic group (e.g., amino group) or a combination thereof.

The term "silica-based coating" disclosed herein refers to a coating of a silica layer or a hybrid coating wherein a silica layer is modified with siloxane polymer. The siloxane polymer coating is formed by reacting the silica with a silane coupling agent in the presence of acid or base catalyst.

The term "surface-modified nanoparticles" in an ink composition disclosed herein refers to surface-modified iron oxide nanoparticles, surface-modified iron hydroxide nanoparticles or a combination thereof.

The term "bottom up synthesis" of the surface-modified iron oxide or/and iron hydroxide nanoparticles in an ink composition disclosed herein refers to a process for making the nanoparticles from one or more iron salts or iron precursors using a wet chemical method or liquid phase synthesis. Some non-limiting examples of the wet chemical method or liquid phase synthesis include chemical precipitation, colloidal method, sol-gel hydrolysis, hydrothermal synthesis, surfactant mediated template process, microemulsion method, polyol synthesis or a combination thereof.

The term "superparamagnetic" refers to a form of magnetism, which exists in nanoscale ferromagnetic or ferrimagnetic materials. Superparamagnetic materials exhibit no magnetic remanence and hysteresis losses at room temperature. Some non-limiting examples of superparamagetic materials are magnetite and maghemite.

The term "polymer substrate" refers to a substrate comprises a plastic or thermoplastic, a thermoset or an elastomer. The term "plastic" or "thermoplastic" refers to a polymer that becomes pliable or moldable above a specific temperature and returns to a solid state upon cooling. Some non-limiting examples of the thermoplastic include polyolefins (such as polyethylene (PE), polypropylene (PP), polymethylpentene (PMP), polybutene-1), crosslinked polyethylene (XLPE), polyamides, polyesters, polycarbonates, polyacrylates, polymethacrylates, polystyrene, polybenzimidazole, halogenated plastics such as poly(vinylidene chloride) and poly(vinyl chloride), polytetrafluoroethylene). Any pliable thermoset or elastomer can also be used herein. In some embodiments, the polymer is selected from the group consisting of thermoplastics, thermosets, elastomers and combinations thereof. In some embodiments, the polymer comprises one or more thermoplastics.

The term "nonporous polymer substrate" refers to a polymer substrate that has a porosity or void fraction less than 0.3, less than 0.25, less than 0.2, less than 0.15, less than 0.1, less than 0.05, less than 0.04, less than 0.03, less than 0.02, or less than 0.01. The porosity or void fraction of a material refers to a fraction of the volume of voids over the total volume of the material.

A composition that is "substantially free" of a compound means that the composition contains less than about 20 wt. %, less than about 10 wt. %, less than about 5 wt. %, less than about 3 wt. %, less than about 1 wt. %, less than about 0.5 wt. %, less than about 0.1 wt. %, or less than about 0.01 wt. % of the compound, based on the total weight of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Disclosed herein is an inkjet ink composition containing surface-modified nanoparticle as an alternative to carbon black based inkjet ink. The inkjet ink composition comprises surface-modified iron oxide or iron hydroxide nanoparticles having superparamagnetic property by means of no magnetic attraction between the nanoparticles, and having tunable surface functionality to provide good dispersing ability in any solvent. The inkjet ink composition disclosed herein attains excellent printing stability by means of no nozzle clogging during inkjet printing and comparable inkjet printing stability with non-pigment ink formation wherein much less insoluble conductive film formulation is deposited on electrode and high voltage deflection plate.

In one aspect, provided herein are an inkjet ink composition comprising:
  a) a colorant comprising surface-modified nanoparticles;
  b) an ink solvent;
  c) a binder; and
  d) one or more optional additive.

In some embodiments, the surface-modified nanoparticles exhibit superparamagnetic property at room temperature, and/or the surface-modified nanoparticles are coated or treated with a layer of silica-based coating, a layer of a functional polymer, or a combination thereof.

In certain embodiments, the surface-modified nanoparticles are prepared by coating or treating the silica-coated nanoparticles with one or more silane coupling agents. In some embodiment, the coating or treatment occurs during the nanoparticle manufacturing stage to produce coated or treated nanoparticles. The nanoparticles may also be coated or treated with an aromatic phosphoric, phosphonic or sulfonic acid (e.g., phenylphosphonic acid) and dispersed in a polymer.

In other embodiments, the surface-modified nanoparticles comprise surface-modified iron oxide nanoparticles, surface-modified iron hydroxide nanoparticles or a combination thereof. In further embodiments, the surface-modified nanoparticles comprise surface-modified iron oxide nanoparticles. In still further embodiments, the surface-modified nanoparticles comprise superparamagnetic surface-modified magnetite or maghemite nanoparticles or a combination thereof.

In certain embodiments, the surface-modified nanoparticles are made from a bottom-up synthesis. In some embodiments, the bottom-up synthesis comprises the steps of:
  a) forming iron oxide or/and iron hydroxide nanoparticles from a solution of iron salts in the presence of one or more functional polymers;
  b) reacting a silanol precursor with the surface of functional groups of the iron oxide or/and iron hydroxide nanoparticles via;
    i) hydrolyzing the silanol precursor to form a silanol; and
    ii) condensing the silanol onto the surface of iron oxide or/and iron hydroxide nanoparticles to form silica-coated iron oxide or/and iron hydroxide nanoparticles; and
  c) hydrolyzing and condensing a silane coupling agent onto silica-coated nanoparticles to form siloxane polymer coating.

In some embodiments, the average diameter of the surface-modified nanoparticles is from about 1 nm to about 150 nm or from about 1 nm to about 80 nm. In certain embodiments, the average diameter of the surface-modified nanoparticles is less than about 90 nm. In other embodiments, the average size or diameter of the nanoparticles is from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, from about 1 nm to about 10 nm, from about 3 nm to about 90 nm, from about 3 nm to about 80 nm, from about 3 nm to about 70 nm, from about 3 nm to about 60 nm, from about 3 nm to about 50 nm, from about 3 nm to about 40 nm, from about 3 nm to about 30 nm, from about 3 nm to about 20 nm, or from about 3 nm to about 10 nm. In further embodiments, the average diameter of the nanoparticles is less than about 90 nm, about 80 nm, about 70 nm, about 60 nm, about 50 nm, less than about 40 nm, less than about 30 nm, less than about 20 nm, or less than about 10 nm. In additional embodiments, the average diameter of the nanoparticles is less than about 50 nm or 100 nm; and more than about 1 nm, more than about 5 nm, more than about 10 nm, more than about 15 nm, or more than about 20 nm.

In some embodiments, the silica coating functions as a stabilizer that helps to disperse the nanoparticle disclosed here in a solvent or as a precursor to react with a silane coupling agent to form sioxane polymer coating. Some non-limiting examples of suitable silanol precursor for the formation of silica coating include tetramethyl orthosilicate (TMOS), tetraethyl orthosilicate (TEOS), tetrapropyl orthosilicate (TPOS), tetrabutyl orthosilicate (TBOS), methyl polysilicate, ethyl polysilicate, etc.

In further embodiments, reacting a silane coupling agent with silica coating to form siloxane polymer coating is to enhance the dispersing ability of the nanoparticles and also the adhesion strength on a particular substrate disclosed here in a solvent. Some non-limiting examples of suitable silane coupling agents obtained from Dow Corning include methyltrimethoxysilane, methyltriethoxysilane, dimethyldimethoxysilane, propyltrimethoxysilane, isobutyltrimethoxysilane, phenyltrimethoxysilane, n-octyltriethoxysilane, aminopropyltriethoxysilane, aminoethylaminopropyltrimethoxysilane, vinylbenzylated aminoethylaminopropyltrimethoxysilane, benzylated-aminoethylaminopropyltrimethoxysilane, γ-methacryloxypropyltrimethoxysilane, γ-glycidoxypropyltrimethoxysilane, γ-chloropropyltrimethoxysilane, γ-chloropropyltriethoxysilane, vinyltrimethoxysilane, vinyltriacetoxysilane, mercaptopropyltriethoxysilane, bis-(triethoxysilylpropyl)-disulfide, bis-(triethoxysilylpropyl)-tetrasulfide, γ-ureidopropyltriethoxysilane, epoxy silane modified melamine resin.

In some embodiments, the functional polymer functions as a stabilizer or a binder or a combination thereof. The functional polymer has at least one functional or polar group pendant from the polymer backbone that helps stabilize and/or disperse the nanoparticles disclosed herein in a solvent. Some non-limiting examples of the functional or polar groups include quaternary ammonium, amino, hydroxyl, heterocyclic moieties, sulfuric acid and sulfate groups, sulfonic acid and sulfonate groups, phosphoric acid and phosphate groups, phosphonic and phosphonate groups, carboxylic acid and carboxylate groups, mixtures thereof, and the like. In certain embodiments, the polymer backbone of the functional polymer comprises a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), acrylic polymers (e.g., methyl methacrylate-co-butyl methacrylate copolymers, polymethyl methacrylate, etc), or a combination thereof.

In certain embodiments, the surface-modified nanoparticles can be prepared by attaching the functional polymer onto siloxane-coated iron oxide or iron hydroxide nanoparticles. Alternatively, the surface-modified nanoparticles can be prepared by grafting a functional polymer on the siloxane-coated iron oxide or iron hydroxide nanoparticles through a surface initiated polymerization of vinylic monomer on the surface of siloxane-coated iron oxide or iron hydroxide nanoparticles.

In certain embodiments, the colorant or the surface-modified nanoparticle is present in an amount from about 1% to about 30% by weight, based on the total weight of the inkjet ink composition. In some embodiments, the colorant is present in an amount from about 1 wt. % to about 30 wt. %, about 2 wt. % to about 30 wt. %, about 3 wt. % to about 30 wt. %, about 1 wt. % to about 25 wt. %, about 1 wt. % to about 20 wt. %, about 1 wt. % to about 15 wt. %, or about 1 wt. % to about 10 wt. %, based on the total weight of the inkjet ink composition. In other embodiments, the colorant is present in an amount less than 30 wt. %, less than 25 wt. %, less than 20 wt. %, less than 15 wt. %, or less than 10 wt. %, based on the total weight of the inkjet ink composition. In further embodiments, the colorant is present in an amount more than 1 wt. %, more than 5 wt. %, more than 10 wt. %, more than 15 wt. %, or more than 20 wt. %, based on the total weight of the inkjet ink composition.

Any organic solvent or a solvent mixture that can dissolve the binder disclosed herein can be used as the ink solvent. The solvent is also a major component which acts as a vehicle for the colorant and provides ink with rapid drying properties. In some embodiments, the ink solvent disclosed herein comprises one or more solvents. The term "major component" refers to the component that is more than 50%, more than 55%, more than 60%, more than 65%, more than 70%, more than 75%, more than 80%, more than 85%, more than 90%, or more than 95% by weight or volume, based on the total weight or volume of the ink solvent.

Some non-limiting examples of the organic solvent include lower alkanols containing 1 to 4 carbon atoms, such as methanol, ethanol, propanol, 2-propanol, butanol etc.; lower aliphatic ketones, such as acetone, dimethyl ketone, methyl ethyl ketone, methyl n-propyl ketone, methyl isobutylketone, cyclopropyl methyl ketone, etc.; other solvents such as ethyl acetate, isopropyl acetate, propyl acetate, butyl acetate; and combinations thereof. In certain embodiments, the solvent component is methyl ethyl ketone, ethyl acetate, ethanol or a combination thereof.

Other non-limiting examples of the solvent include ketone solvents, acetate solvents, the propionate esters, and carbonate solvents. Some non-limiting examples of the ketone solvents include methyl isoamyl ketone, methyl m-amyl ketone, diisobutylketone, diacetone alcohol, C-11 ketone, acetophenone, cyclohexanone and the like. Some non-limiting examples of the acetate solvents include dimethyl acetate, butyl acetate, isobutyl isobutyrate, n-butyl propionate, 2-ethylhexyl acetate, and the like. Some non-limiting examples of the glycol ethers such as propylene glycol monomethyl ether, ethylene glycol monomethyl ether, propylene glycol monotertiary buty ether, ethylene glycol monopropyl ether, propylene glycol monopropyl ether, propylene glycol monobutyl ether, ethylene glycol monobutyl ether, diethylene glycol monomethyl ether, dipropylene glycol monomethyl ether, diethylene glycol monoethyl ether, diethylene glycol monopropyl ether, diethylene glycol monobutyl ether, and the like. Some non-limiting examples of the glycol ether acetate such as ethylene glycol monoethyl ether acetate, ethylene glycol monobutyl ether acetate, ethylene glycol diacetate, diethylene glycol monoethyl ether acetate, diethylene glycol monobutyl ether acetate, diethylene glycol monoethyl ether acetate, propylene glycol monomethyl ether acetate, and the like. Some non-limiting examples of the carbonate solvents comprise dimethyl carbonate, diethyl carbonate, ethylene carbonate, propylene carbonate, and the like. Some non-limiting examples of other solvent include N-methyl pyrrolidone, N-ethyl pyrrolidone, quinoline, pyridine, dimethyl formamide, m-cresol, 2-chlorophenol, and the like. The composition of the ink solvent further allows tuning the drying rate of the ink and adjusting the solution viscosity to any desired range, such as 2 to 10 mPa·s, for inkjet printers.

In certain embodiments, the ink solvent is selected from the group consisting of ketones, alcohols, esters, and combinations thereof. In certain embodiments, the ink solvent comprises a mixture of methyl ethyl ketone, ethyl acetate and ethanol. In certain embodiments, the ink solvent is substantially free of water. In other embodiments, the ink solvent contains less than 0.1 wt. %, less than 0.5 wt. %, less than 1 wt. %, less than 2 wt. %, less than 3 wt. %, or less than 5 wt. % of water, based on the total weight of the ink solvent.

In some embodiments, the ink solvent is present in an amount from about 50% to about 85% by weight, or from about 65% to about 80% by weight, based on the total weight of the inkjet ink composition. In other embodiments, the ink solvent is present in an amount less than 90 wt. %, less than 85 wt. %, less than 80 wt. %, less than 75 wt. %, or less than 70 wt. %, based on the total weight of the inkjet ink composition. In further embodiments, the ink solvent is present in an amount more than 40 wt. %, more than 45 wt. %, more than 50 wt. %, more than 60 wt. %, or more than 65 wt. %, based on the total weight of the inkjet ink composition.

The binder disclosed herein can be used to promote ink adhesion on substrates. Some non-limiting examples of the binders include aldehyde-ketone resins, epoxy resins, rosin esters, phenolic modified rosin resin, fumaric modified rosin resin, maleic modified rosin resin, hydrogenated rosin resin, dimerized rosin resin, silicon resins, alkyl benzene-sulfonamide resins, vinyl resins, cellulose derivatives, styrene-acrylic resins, styrene-maleic anhydride copolymers, acrylic resins, polyurethanes, polyurethane derivatives, polyester resins, polyamides, polysiloxane resins, poly(vinyl butyral) resins, aldehyde resins, phenolic resins, etc. In certain embodiments, a combination of two or more binders is used in order to provide better balance between the adhesion ability and ink viscosity.

In certain embodiments, the binder disclosed herein is a polyurethane (e.g., polyether polyurethanes, polyester polyurethanes, and polycarbonate polyurethanes), a polyether, a polyester, a polycarbonate, a vinyl polymer (e.g., vinyl chloride-vinyl acetate copolymers, and styrene copolymers), acrylic polymers (e.g., methyl methacrylate-co-butyl methacrylate copolymers, methyl methacrylate homopolymer, etc) or a combination thereof. In some embodiments, the binder is a self-wetting binder comprising one or more polar group for interacting with the surface of the surface-modified nanoparticles. Some non-limiting examples of suitable polar groups include quaternary ammonium, amino, hydroxyl, heterocyclic moieties, sulfuric acid and sulfate groups, sulfonic acid and sulfonate groups, phosphoric acid and phosphate groups, phosphonic and phosphonate groups, carboxylic acid and carboxylate groups, mixtures thereof, and the like. Some self-wetting binders are disclosed in U.S. Pat. Nos. 6,139,946 and 6,139,966, both of which are incorporated herein by reference.

In some embodiments, the amount of the binders is from 0.1% to 50%, from 0.1% to 40%, from 0.1% to 35%, from 0.5% to 30%, or from 1% to 25%. In certain embodiments, the binder is present in an amount from about 0.1% to about 35% by weight, based on the total weight of the inkjet ink composition. In other embodiments, the binder is present in an amount less than 35 wt. %, less than 30 wt. %, less than 25 wt. %, less than 20 wt. %, or less than 15 wt. %, based on the total weight of the inkjet ink composition. In further embodiments, the binder is present in an amount more than 0.1 wt. %, more than 1 wt. %, more than 3 wt. %, more than 5 wt. %, or more than 10 wt. %, based on the total weight of the inkjet ink composition.

Optionally, the inkjet ink composition disclosed herein comprises at least one additive for the purposes of improving and/or controlling the processibility, appearance, physical, chemical, and/or mechanical properties of the inkjet ink composition. In some embodiments, the inkjet ink composition does not comprise an additive. Any inkjet ink additive known to a person of ordinary skill in the art may be used in the inkjet ink composition disclosed herein.

In some embodiments, the additive is selected from the group consisting of plasticizers, surfactants or surface modifiers, light stabilizers, defoaming agents, antioxidants, UV stabilizers, bactericides, conducting agents, rub resistant agents, and combinations thereof. In other embodiments, the additive comprises one or more plasticizers for solubilizing the binder. In further embodiments, the inkjet ink composition disclosed herein is substantially free of one or more of plasticizers, surfactants or surface modifiers, light stabilizers, defoaming agents, antioxidants, UV stabilizers, bactericides, conducting agents, and rub resistance agents.

In some embodiments, the total amount of the additives is from 0.1% to 10%, from 0.1% to 8%, from 0.1% to 6%, from 0.1% to 5%, from 0.1% to 4%, from 0.1% to 3%, from 0.1% to 2%, or from 0.1% to 1% by weight, based on the total weight of the inkjet ink composition. In certain embodiments, the total amount of the additive is from about 1 wt. % to about 10 wt. %, about 2 wt. % to about 10 wt. %, about 3 wt. % to about 10 wt. %, about 0.1 wt. % to about 8 wt. %, about 0.1 wt. % to about 6 wt. %, about 0.1 wt. % to about 5 wt. %, or about 0.1 wt. % to about 4 wt. %, based on the total weight of the inkjet ink composition. In other embodiments, the total amount of the additive is less than 10 wt. %, less than 8 wt. %, less than 6 wt. %, less than 5 wt. %, or less than 4 wt. %, based on the total weight of the inkjet ink composition. In further embodiments, the total amount of the additive is more than 0.1 wt. %, more than 0.5 wt. %, more than 1 wt. %, more than 2 wt. %, or more than 3 wt. %, based on the total weight of the inkjet ink composition.

The inkjet ink composition disclosed herein can comprise a plasticizer. Any plasticizer known to a person of ordinary skill in the art may be added to the inkjet ink composition disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polyester phthalate, polyester adipate, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioesters, aromatic sulfonamides and combinations thereof. Where used, the amount of the plasticizer in the inkjet ink composition can be from 0 to about 10 wt. %, from about 0.5 wt. % to about 10 wt. %, or from about 1 wt. % to about 5 wt. % of the total weight of the inkjet ink composition. Some plasticizers have been described in George Wypych, "Handbook of Plasticizers,"

ChemTec Publishing, Toronto-Scarborough, Ontario (2004), which is incorporated herein by reference. In further embodiments, the inkjet ink composition disclosed herein is substantially free of plasticizer.

In some embodiments, the plasticizers include diethyl phthalate, di-n-butyl phthalate, diisobutyl phthalate, di-n-hexyl phthalate, bis(2-ethylhexyl) phthalate, diisodecyl phthalate, diisononyl phthalate, 1,2-cyclohexane dicarboxylic acid diisonoyl ester, tri-(2-ethyl hexyl)trimellitate, tri-(n-octyl, n-decyl)trimellitate, tri-(heptyl, nonyl)trimellitate, n-octyl trimellitate, bis(2-ethylhexyl)adipate, etc. In other embodiments, the total amount of the binders and the plasticizers is from 0.1% to 50%, from 0.1% to 40%, from 0.1% to 35%, from 0.5% to 30%, from 1% to 25%, from 2% to 20%, or from 3% to 15% by weight, based on the total weight of the inkjet ink composition.

The inkjet ink composition disclosed herein optionally comprises an antioxidant that can prevent the oxidation of polymer components and organic additives in the inkjet ink composition. Any antioxidant known to a person of ordinary skill in the art may be added to the inkjet ink composition disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the inkjet ink composition can be from about greater than 0 to about 5 wt. %, from about 0.0001 to about 2.5 wt. %, from about 0.001 wt. % to about 1 wt. %, or from about 0.001 wt. % to about 0.5 wt. % of the total weight of the graft copolymer composition. Some antioxidants have been described in Zweifel Hans et al., "Plastics Additives Handbook," Hanser Gardner Publications, Cincinnati, Ohio, 5th edition, Chapter 1, pages 1-140 (2001), which is incorporated herein by reference. In further embodiments, the inkjet ink composition disclosed herein is substantially free of antioxidant.

The inkjet ink composition disclosed herein optionally comprises an UV stabilizer that may prevent or reduce the degradation of the inkjet ink composition by UV radiations. Any UV stabilizer known to a person of ordinary skill in the art may be added to the inkjet ink composition disclosed herein. Non-limiting examples of suitable UV stabilizers include benzophenones, benzotriazoles, aryl esters, oxanilides, acrylic esters, formamidines, carbon black, hindered amines, nickel quenchers, phenolic antioxidants, metallic salts, zinc compounds and combinations thereof. Where used, the amount of the UV stabilizer in the inkjet ink composition can be from 0 to about 5 wt. %, from about 0.01 wt. % to about 3 wt. %, from about 0.1 wt. % to about 2 wt. %, or from about 0.1 wt. % to about 1 wt. % of the total weight of the inkjet ink composition. Some UV stabilizers have been described in Zweifel Hans et al., "Plastics Additives Handbook," Hanser Gardner Publications, Cincinnati, Ohio, 5th edition, Chapter 2, pages 141-426 (2001), which is incorporated herein by reference. In further embodiments, the inkjet ink composition disclosed herein is substantially free of UV stabilizer.

The inkjet ink composition disclosed herein optionally comprises a surfactant. The surface modifiers or surfactants can be used to regulate the surface tension of inkjet ink composition disclosed herein and/or disperse the surfaced-modified nanoparticles in the ink solvent disclosed herein. Some non-limiting examples of suitable surfactants include anionic surfactants, cationic surfactants, non-ionic surfactants, zwitterionic surfactants, and combinations thereof. In some embodiments, one or more anionic surfactants, one or more non-ionic surfactants or a combination thereof are used. In further embodiments, the inkjet ink composition disclosed herein is substantially free of one or more of anionic surfactants, cationic surfactants, non-ionic surfactants, and zwitterionic surfactants.

Some non-limiting examples of the suitable surfactants include fluorosurfactants, siloxane-based surfactants, acetylenic diol-based surfactants, hydrocarbon-based surfactants, and combinations thereof. In some embodiments, two or more surfactants are used together in order to optimize the jetting stability.

In some embodiments, the surfactant is a phosphorylated polyoxyalkyl polyol ("POCA"). The POCA surfactant is fully described in U.S. Pat. No. 4,889,895. In some embodiments, the surfactant is one of the Emcol surfactants such as Emcol Chloride, Emcol Phosphate, and Emcol Acetate available from Witco Chemical, Oakland, N.J. The Emcol surfactants are polypropoxylated quaternary ammonium based cationic surfactants.

In some embodiments, the anionic surfactant is or comprises an alkyl sulfate, an alkyl sulfonate, an alkylaryl sulfate, an alkylaryl sulfonate (e.g., alkyl-naphthalene sulfonates and alkylbenzene sulfonates) or a combination thereof.

In certain embodiments, the non-ionic surfactant is or comprises an alkyl polyoxyalkylene, an aryl polyoxyalkylene, a polyoxyalkylene block copolymers, a polyethylene oxide, a polypropylene oxide, a block copolymer of ethylene oxide and propylene oxide or a combination thereof. In other embodiments, the non-ionic surfactant is or comprises a polyether polyol, a polyoxyethylene $C_{8-20}$-alkyl ether, a polyoxyethylene $C_{8-20}$-alkylaryl ether (e.g., polyoxyethylene $C_{8-20}$-alkylphenyl ether), a polyoxyethylene $C_{8-20}$-alkyl amine, a polyoxyethylene $C_{8-20}$-alkenyl ether, a polyoxyethylene $C_{8-20}$-alkenyl amine, a polyethylene glycol alkyl ether or a combination thereof. Some non-limiting examples of suitable polyoxyethylene $C_{8-20}$-alkyl ethers include polyoxyethylene lauryl ether, polyoxyethylene cetyl ether, polyoxyethylene stearyl ether, polyoxyethylene branched decyl ether, polyoxyethylene tridecyl ether or a combination thereof. Some non-limiting examples of suitable polyoxyethylene $C_{8-20}$-alkylaryl ethers include polyoxyethylene dodecylphenyl ether, polyoxyethylene nonylphenyl ether, polyoxyethylene octylphenyl ether or a combination thereof. One non-limiting example of suitable polyoxyethylene $C_{8-20}$-alkenyl ether is polyoxyethylene oleic ether. Some non-limiting examples of suitable polyoxyethylene $C_{8-20}$-alkyl amines include polyoxyethylene lauryl amine, polyoxyethylene stearyl amine, polyoxyethylene tallow amine or a combination thereof. One non-limiting example of suitable polyoxyethylene $C_{8-20}$-alkenyl amine is polyoxyethylene oleyl amine. In other embodiments, the non-ionic surfactant is a polyether polyol, polyoxyethylene nonylphenyl ether, polyoxyethylene dodecylphenyl ether or a combination thereof. In certain embodiments, the non-ionic surfactant contains a polyoxyethylene hydrophilic tail.

The inkjet ink composition disclosed herein optionally comprises a conducting agent or an antistatic agent. The conducting agent or antistatic agent can be used to increase the conductivity of the inkjet ink composition and to prevent static charge accumulation. Non-limiting examples of suitable conducting agents or antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference. In further embodiments, the inkjet ink composition disclosed herein is substantially free of conducting or antistatic agent.

In some embodiments, the conducting or antistatic agent is selected from the salts of alkali metals, alkaline earth metals and quaternary ammonium. The counter ions of the salts can be selected from halides (chlorides, bromides, iodides, fluorides), perchlorates, nitrates, thiocyanates, formates, acetates, sulfates, propionates, hexafluorophosphates, hexafluoroantimonates and combinations thereof. Some non-limiting examples of the conducting salt can also be ionic liquids such as 1-butyl-3-methylimidazolium tetrafluoroborate, and 1-butyl-3-methylimidazolium hexafluorophosphate.

In certain embodiments, the inkjet ink composition does not flocculate during inkjet printing. In other embodiments, the inkjet ink composition does not flocculate after stored for more than 1 week, more than 1 month, more than 6 months, or more than 1 year at room temperature or an elevated temperature (e.g., about 35° C., about 40° C., about 50° C., about 60° C., or about 5° C. or about 10° C. below the boiling point of the ink solvent).

In some embodiments, a print formed on a first nonporous substrate by an inkjet printer using the inkjet ink composition disclosed herein is not substantially transferred to a second nonporous substrate after the first nonporous substrate and the second nonporous substrate with the print between the first and second substrates are bundled by wrapping with a polyethylene wrap and then pressed under a load of 500 g, 1 kg, 2 kg, about 5 kg, or about 10 kg at about 40° C., about 50° C., or about 60° C. for about 12 hours, about 24 hours, or about 48 hours. In other embodiments, the amount of the print transferred from the first nonporous substrate to the second nonporous substrate is less than 0.1%, less than 0.5%, less than 1%, less than 2.5%, or less than 5% of the print by weight or area after the first nonporous substrate and the second nonporous substrate with the print between the first and second substrates are bundled by wrapping with a polyethylene wrap and then pressed under a load of 500 g, 1 kg, 2 kg, about 5 kg, or about 10 kg at about 40° C., about 50° C., or about 60° C. for about 12 hours, about 24 hours, or about 48 hours.

In certain embodiments, each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

In one aspect, provided herein is a method of making the surface-modified iron oxide or/and iron hydroxide nanoparticles disclosed herein. In some embodiments, the surface-modified iron oxide or/and iron hydroxide nanoparticles are produced through a bottom-up synthesis comprising the steps of:

a) forming iron oxide or/and iron hydroxide nanoparticles from a solution of iron salts in the presence of one or more functional polymers;

b) reacting a silanol precursor with the surface of functional groups of the iron oxide or/and iron hydroxide nanoparticles via;

i) hydrolyzing the silanol precursor to form a silanol; and ii) condensing the silanol onto the surface of iron oxide or/and iron hydroxide nanoparticles to form silica-coated iron oxide or/and iron hydroxide nanoparticles; and c) hydrolyzing and condensing a silane coupling agent onto silica-coated nanoparticles to form siloxane polymer coating.

Unlike traditional black pigment ink using carbon black as a colorant which require a high energy and time-consuming grinding process to disperse the carbon black in solvent, the surface-modified iron oxide or/and iron hydroxide nanoparticles disclosed herein are highly dispersible in solvent.

The inkjet ink formulation disclosed herein can be applied to a nonporous plastic surface using a continuous inkjet printer, such as Leibinger Jet 2 & Jet 3 series. The inkjet ink composition can be used for printing a black marking on a surface of the nonporous plastic, for example, poly(vinyl chloride) (PVC), high density polyethylene (HDPE), corona treated HDPE, crosslinked PE (XLPE). The resulting marking on the nonporous plastic possesses high hiding power, good contrast, good transfer resistance, good light fastness, as compared to carbon black-based inkjet ink composition.

In some embodiments, the inkjet ink composition disclosed herein comprises:

i) one or more surface-modified iron oxide or/and iron hydroxide nanoparticles in an amount varying from 0.01% to 30%, from 0.05% to 20%, from 0.1% to 10%, or from 0.05% to 5% by weight;

ii) one or more ink solvents in an amount from 30% to 90%, from 40% to 85%, from 50% to 85%, from 50% to 80%, or from 50% to 70% by weight; and iii) one or more binders in an amount from 0.1% to 50%, from 0.1% to 40%, from 0.1% to 35%, from 0.5% to 30%, from 1% to 25%, from 2% to 20%, or from 3% to 15% by weight. In some embodiments, the inkjet ink composition further comprises one or more additives.

In some embodiments, the inkjet ink compositions disclosed herein have viscosities ranging from about 1 mPa·s to about 25 mPa·s, from about 2 mPa·s to about 10 mPa·s, or from about 2.5 mPa·s to about 5.5 mPa·s. In certain embodiments, the inkjet ink compositions disclosed herein have electrical conductivities generally higher than 300 μS/cm, higher than 400 μS/cm, higher than 500 μS/cm, higher than 600 μS/cm, higher than 800 μS/cm, or higher than 1000 μS/cm at 20° C.

The surface-modified iron oxide nanoparticles and/or the iron hydroxide nanoparticles act as a colorant in inkjet ink composition. In some embodiments, the crystal structure and/or oxidation state of the iron oxide nanoparticles or iron hydroxide nanoparticles is adjustable to display black, brown, yellow or red color. For example, the iron oxide nanoparticles can be either $Fe_3O_4$ or $\gamma\text{-}Fe_2O_3$ or $\alpha\text{-}Fe_2O_3$ or mixtures thereof, wherein $Fe_3O_4$ is black, $\gamma\text{-}Fe_2O_3$ is brown, $\alpha\text{-}Fe_2O_3$ is transparent. A combination of one or more iron oxides may also be used. In some embodiments, the amount of the iron oxide is less than 30%, less than 20%, less than 15%, less than 10%, less than 8%, less than 6%, or less than 5% by weight, based on the total weight of the inkjet ink composition. In further embodiments, the inkjet ink composition disclosed herein is substantially free of iron oxide particles without a layer of silica and/or a layer of a functional polymer.

The iron hydroxide can be either ferrihydrite, lepidocrocite or mixtures thereof, wherein ferrihydrite is yellow-brown color and lepidocrocite is ruby red color.

A combination of one or more iron hydroxide may also be used. In some embodiments, the amount of the iron hydroxide is less than 30%, less than 20%, less than 15%, less than 10%, less than 8%, less than 6%, or less than 5% by weight, based on the total weight of the inkjet ink composition. Some non-limiting examples of iron hydroxides include ferrihydrite ($2FeOOH.2.6H_2O$), goethite ($\alpha$-FeO(OH)), akaganeite ($\beta$-FeOOH), and lepidocrocite ($\gamma$-FeO(OH)) or a combination thereof. In further embodiments, the inkjet ink composition disclosed herein is substantially free of iron hydroxide particles without a layer of silica and/or a layer of a functional polymer.

Optional components may be added to the ink formulation to provide extra security of printing marks under any kinds of any physical or chemical trigger, for example fluorescent dye, rare earth elements so that the ink becomes visible under weak UV and IR irradiation. The optional component is generally less than 2%, or from about 0.05% to 0.8% by weight, based on the total weight of the inkjet ink composition.

The inkjet ink composition can be prepared by any suitable method, for example, by mixing all required ingredients at room temperature or upon heating and filtering the ink solution to remove any undesirable materials.

In some embodiments, the inkjet ink composition comprises:
 (i) one or more surface modified iron oxide or/and iron hydroxide nanoparticle in an amount from 15% to 25% by weight;
 (ii) one or more ink solvents in an amount from 58% to 79% by weight;
 (iii) one or more binders in an amount from 6% to 15% by weight; and
 (iv) one or more additives in an amount from 0.1% to 2% by weight.

In some embodiments, the substrate comprises one or more polymers or a coating comprising one or more polymers. Some non-limiting examples of polymers include thermoplastics, thermosets and elastomers. In certain embodiments, the substrate is nonporous. In other embodiments, the substrate is pliable or moldable. In certain embodiments, the polymer is selected from the group consisting of polyolefins such as low density poly(ethylene) (LDPE), high density poly(ethylene) (HDPE), crosslinked poly(ethylene) (XLPE) and poly(propylene); ethylene vinyl acetate copolymers; polyethers such as poly(phenyl ether); styrenics polymers such as polystyrene, poly(methyl styrene); polyacrylates such as poly(methyl methacrylate), poly(butyl methacrylate); chlorinated polymers such as poly(vinyl chloride), poly(vinylidene chloride); polycarbonates; epoxy resins and combinations thereof.

The substrate can be in the form of a film, a laminate, a molded article, an extruded article, or a package material. The molded article or the extruded article can be selected from toys, grips, soft touch handles, bumper rub strips, floorings, auto floor mats, wheels, casters, furniture and appliance feet, tags, seals, gaskets, automotive doors, bumper fascia, grill components, rocker panels, hoses, linings, PVC pipes, office supplies, liners, diaphragms, tubes, lids, stoppers, plunger tips, delivery systems, kitchen wares, shoes, shoe bladders, and shoe soles. The package material can be for consumer products such as dairy products, beverages, snacks, food products, plastic bottles, PVC cable, electrical wirings, and optical fibers.

In certain embodiments, the printing with the inkjet ink composition disclosed herein is done by using an inkjet printer such as a continuous inkjet printer in a production line. In some embodiments, the speed of the production line is from about 30 to about 50 meter/minute, from about 20 to about 60 meter/minute, or from about 35 to about 45 meter/minute. In some embodiments, the speed of the production line is at more than 10 meter/minute, more than 20 meter/minute, more than 30 meter/minute, more than 40 meter/minute, or more than 50 meter/minute.

In another aspect, provided herein is a method of the inkjet ink on a polymer substrate, wherein the ink comprises superparamagnetic magnetite or maghemite nanoparticles or a combination thereof may provide an additional feature such as magnetic detection. The superparamagnetic signal can be detected by sensitive giant magnetoresistance device.

In another aspect, provided herein is a method of the inkjet ink on a polymer substrate, wherein the ink comprises surface-modified iron oxide or/and iron hydroxide nanoparticle may provide outstanding heat resistance up to 1200° C. with less that 50% weight loss.

In another aspect, the method disclosed herein produces transparent protective coating on a polymer substrate, wherein the ink comprises hematite nanoparticles to provide outstanding weather resistance and excellent UV absorption properties. The coating can be prepared by first inkjet the ink on a substrate, followed by sintering the nanoparticles to form a protective coating.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The examples below demonstrate some embodiments of the inkjet ink compositions in accordance with the present invention.

The conductivity of the inkjet ink composition Example 1 was measured by a conductivity meter using a 100 g of the inkjet ink composition. The conductivity meter was calibrated by a 84 μS/cm standard solution and a 1,413 μS/cm standard solution before the measurement.

The viscosity of the inkjet ink composition Example 1 was measured according to Lubrizol Test No. AATM105Ab using a Brookfield viscometer.

The surface tension of the inkjet ink composition Example 1 was calculated from the contact angle of the inkjet ink composition by using the OneAttension software (obtained from Biolin Scientific, Stockholm, Sweden). The contact angle of the inkjet ink composition was measured by an optical tensiometer "Attension Theta") (obtained from Biolin Scientific) using 3-5 µL of the inkjet ink composition hanging from the tip of a micro-syringe.

The dispersion stability of the inkjet ink composition Example 1 was evaluated by the accelerated stability test, wherein a 100 g of the inkjet ink composition was stored at a 50° C. oven and their viscosity and particle size were measured everyday for 15 consecutive days according to ratings A-C as shown below.

A: the changes in viscosity and particle size were ±5% or less after storage at 50° C. for 15 days.
B: the changes in viscosity and particle size were more than 5% to 10% after storage at 50° C. for 15 days.
C: the changes in viscosity and particle size were more than 10% after storage at 50° C. for 15 days.

The printing stability test of the inkjet ink composition Example 1 was conducted by continuously jetting the inkjet ink for 8 hours per day with a line speed of 45 meter per minute for 15 days, wherein the gutter remains open and no gutter cleaning is allowed throughout the study. The printing stability of the inkjet ink composition was evaluated by directly observing the test image printed everyday by the inkjet printer. The prints were classified into the following two catalogues:

A: Successfully printed at intended sites.
B: Not printed at intended sites with print defects due to nozzle clogging.

The long term stability of the inkjet ink composition was evaluated by observing how long the ink can run without encountering the high voltage error during standby mode in 15 days.

Y: High voltage error occurs due to suffering from serious ink deposition on high voltage deflection plates or deviation of the ink line (Duration of running before high voltage error will be recorded).
N: No high voltage error occurs.

A mark such as a pattern or image or information was printed on a single or multi-layered polymer substrates thereof with an inkjet ink composition Example 1 disclosed herein using a continuous inkjet printer at a line speed of 45 meter/minute.

The transfer resistance of the inkjet ink composition Example 1 was evaluated by printing the inkjet ink composition on a PVC cable with a length of 5 cm and a width of 0.5 cm. After treating for 30 second at room temperature, the cable was pressed by another cable with the same length without marking, followed by bundling the two cables by wrapping with a polyethylene wrap. Subsequently, the bundled cables were pressed under a constant weight of 500 g and placed the cables in a 50° C. oven. After 24 hours, the bundled cables were withdrawn from the oven, followed by checking whether there was transferring of the mark to another cable via unaided eye under an inspection site with light illumination at room temperature.

Y: Ink transfer occurs from one cable to another cable
N: No ink transfer occurs Example 1

Example 1 was an inkjet ink composition prepared by Steps A and B as shown below.
A) Preparation of Surface-Modified Iron Oxide or/and Iron Hydroxide Nanoparticles The magnetite ($Fe_3O_4$) nanoparticles were prepared as follows: $FeCl_2 \cdot 4H_2O$ (1.99 g) and anhydrous $FeCl_3$ (3.25 g) were dissolved in water (20 mL) separately, and mixed under vigorous stirring (3000 rpm) using a high shear mixer. A $NH_4OH$ solution (0.6 M, 200 mL) was then added to the stirred mixture at room temperature under nitrogen atmosphere, immediately followed by the addition of a concentrated $NH_4OH$ solution (25 wt. %, 30 mL) to maintain the reaction pH between 9 and 11. The resulting black dispersion was continuously stirred for 1 hour at room temperature to yield a black dispersion. The $Fe_3O_4$ nanoparticles were then purified by a repeated centrifugation (3000-6000 rpm for 20 minutes), decantation, and re-dispersion cycle for 3 times until a stable black dispersion was obtained. A total of 100 mL of the $Fe_3O_4$ nanoparticle dispersion (2.42 wt. %) prepared above was acidified with a $HNO_3$ solution (4 M, 100 mL) and then centrifuged at 3000 rpm for 20 min to collect the $Fe_3O_4$ nanoparticles. The collected $Fe_3O_4$ nanoparticles were re-dispersed in water (200 mL), and the dispersion was heated to reflux under nitrogen atmosphere. Trisodium citrate dihydrate (11.7 g) was then added, followed by heating the mixture for 1 hour under reflux to produce citrate-coated $Fe_3O_4$ nanoparticles. The black dispersion was purified by being placed into a dialysis tube (10 kDa molecular weight cutoff, Sigma-Aldrich) and dialyzed against water for 8 days with a daily change of water until the conductivity of water was comparable to that of purified $H_2O$ used.

The acid modified $Fe_3O_4$ nanoparticles were treated with an alkaline solution and mixed with a silanol precursor, the resulting solution was allowed to react at 40° C. for 24 hours. Example of silanol precursor includes tetramethyl orthosilicate (TMOS), tetraethyl orthosilicate (TEOS), tetrapropyl orthosilicate, (TPOS), tetrabutyl orthosilicate (TBOS), methyl polysilicate, ethyl polysilicate, etc. In one embodiment, tetraethyl orthosilicate in a molar concentration ranging from 0.02 to 0.16 M was added. The resulting mixture was subsequently mixed with a silane coupling agent containing vinylic groups in an alcohol/water mixture in a volume ratio of 4 to 1, and the above mixture was allowed to react at 40° C. for 24 hours to form vinylic coated $Fe_3O_4$ nanoparticles. The silane coupling agent can be (3-triethoxysilyl)propyl methacylate (MPS), (3-methyldiethoxysilyl)propyl methacrylate, (3-triethoxysilyl)propyl 2-propenoate, (trimethoxysilyl)methyl methacrylate, (triethoxysilyl)methyl methacylate, etc. In one embodiment, 3-(trimethoxysilyl)propylmethacrylate in a molar concentration from 0.2 to 0.8 M was added.

The vinylic-coated $Fe_3O_4$ nanoparticles were collected by placing a permanent magnet (4 Tesla) next to the container wall, followed by discarding the solution. The collected magnetic nanoparticles were re-dispersed in MEK (20 mL) and the dispersion was transferred into a dialysis tube (10 kDa molecular weight cutoff, Sigma-Aldrich) and dialyzed against MEK for 1 week with a daily change of MEK to remove the unreacted MPS, TEOS, and $NH_3$. The amounts of unreacted MPS molecules removed through the dialysis were monitored with an ultraviolet (UV) measurements using a PerkinElmer UV-vis spectrophotometer (Lambda 35) at 203.5 nm. Finally, the purified dispersion was concentrated to a 10.0 wt. % solid content for subsequent reactions.

B) Preparation of Inkjet Ink Composition

The inkjet ink composition was prepared as follows: A mixture of vinyl-coated $Fe_3O_4$ nanoparticle dispersion (10% in MEK); 12 g of a binder resin comprising a mixture of 8 wt. % Vinnol H14/36 and 4 wt. % Paraloid B99N; 61.5 g of an ink solvent system containing 10 wt. % ethyl acetate, 5% ethanol, and 87 wt. % methyl ethyl ketone; and 1.5 g of additives comprising 70 wt. % sodium hexafluorophosphate and 30 wt. % fluorosurfactant was mixed at room temperature. The mixture was further processed with an IKA homogenizer (obtained from IKA Works GmbH & Co. KG in Staufen, Germany) at room temperature or upon heating, and finally inkjet ink composition was filtered to remove any undesirable materials.

The conductivity, viscosity, surface tension, dispersion stability, printing stability, long term stability and transfer resistance of the inkjet ink composition Example 1 and a carbon black based ink (used as a comparative example) were measured. The formulations and the test results of Example 1 and the carbon black based ink are shown in Table 1 below.

Example 2

Example 2 was an inkjet ink composition prepared by a procedure similar to the procedure for Example 1 except the formulation for Example 2 was different, which is shown in Table 1 below. The conductivity, viscosity, surface tension, dispersion stability, printing stability, long term stability and transfer resistance of the inkjet ink composition Example 2 were measured. The test results of Example 2 are also shown in Table 1 below.

TABLE 1

|  | Carbon black based ink | Non-pigment ink | Example 1 | Example 2 |
|---|---|---|---|---|
| Vinyl-coated $Fe_3O_4$ (10% in MEK) (g) | 0 | 0 | 15 | 25 |
| Pigment black 7 (g)[1] | 3.5 | 0 | 0 | 0 |
| Solvent black 27 (g) | 0 | 4.5 | 0 | 0 |
| Binder resin (g)[2] | 10 | 12 | 10 | 10 |
| Ink solvent system (g)[3] | 85 | 85 | 68.5 | 63.5 |
| Additives (g)[4] | 1.5 | 1.5 | 1.5 | 1.5 |
| Total (g) | 100 | 100 | 100 | 100 |
| Properties of ink |  |  |  |  |
| Conductivity (μS/cm) at 25° C. | 780 | 880 | 620 | 550 |
| Viscosity (mPa · s) at 25° C. | 4.5 | 4.5 | 5.5 | 6.5 |
| Surface tension (mN/m) at 25° C. | 26.2 ± 1.0 | 24.5 ± 0.5 | 25.5 ± 1.0 | 27.5 ± 1.0 |
| Dispersion stability | A | N/A | A | A |
| Printing stability | A | A | A | A |
| Long term stability (15 days) | Y(4 days) | N | N | N |
| Transfer resistance | N | Y | N | N |

Note:
[1]Pigment black 7 was pre-modified with vinyl copolymer.
[2]The binder resin was 8% Vinnol H14/36 (obtained from WACKER) and 4% Paraloid B99N (obtained from DOW).
[3]The ink solvent system contained 10 wt. % ethyl acetate, 2 wt. % ethanol, and the remaining part was methyl ethyl ketone.
[4]The additives contained 70% sodium hexafluorophosphate and 30% FC 430 fluorosurfactant (obtained from 3M, USA).

Based on the data in Table 1 above, Examples 1 and 2 disclosed herein produce black colored ink with excellent dispersion and printing stability.

Based on the data in Table 1 above, Examples 1 and 2 disclosed herein produce ink coating with excellent transfer resistance on nonporous packaging materials, for example, PVC cables.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An inkjet ink composition comprising:
    a) a colorant comprising a cluster of surface-modified nanoparticles, wherein the surface-modified nanoparticles exhibit superparamagnetic or/and paramagnetic property at room temperature, and wherein the surface-modified nanoparticles are coated with a layer of silica layer, a layer of a functional polymer, or a combination thereof;
    b) an ink solvent;
    c) a binder; and
    d) an additive;
wherein the surface-modified nanoparticles comprise surface-modified iron oxide nanoparticles, surface-modified iron hydroxide nanoparticles, or a combination thereof;
    wherein the ink composition, after being applied to a first nonporous substrate, provides a print formed on the first nonporous substrate which is not substantially transferred to a second nonporous substrate after the first nonporous substrate and the second nonporous substrate with the print between the first and second nonporous substrates are bundled by wrapping with a polyethylene wrap and then pressed under a load, at a temperature for a period of time;
    wherein the load is 500 g, 1 kg, 2 kg, 5 kg, or 10 kg; the temperature is 40° C., 50° C., or 60° C.; and the period of time is 12 hours, 24 hours, or 48 hours;
    wherein the amount of the print transferred from the first nonporous substrate to the second nonporous substrate is less than 0.1%, 0.5%, 1%, or 2.5% of the print by weight or area.

2. The inkjet ink composition of claim 1, wherein the surface-modified nanoparticles comprise surface-modified iron hydroxide nanoparticles.

3. The inkjet ink composition of claim 1, wherein the surface-modified nanoparticles comprise surface-modified iron oxide nanoparticles.

4. The inkjet ink composition of claim 1, wherein the surface-modified nanoparticles comprises superparamagnetic surface-modified magnetite or maghemite nanoparticles or a combination thereof.

5. The inkjet ink composition of claim 1, wherein the surface-modified nanoparticles are made from a bottom-up synthesis, wherein the bottom-up synthesis comprises the steps of:
    a) forming iron oxide or/and iron hydroxide nanoparticles from a solution of iron salts in the presence of one or more functional polymers;
    b) reacting a silanol precursor with the surface of functional groups of the iron oxide or/and iron hydroxide nanoparticles via;
        i) hydrolyzing the silanol precursor to form a silanol; and
        ii) condensing the silanol onto the surface of iron oxide or/and iron hydroxide nanoparticles to form silica-coated iron oxide or/and iron hydroxide nanoparticles; and c) hydrolyzing and condensing a silane coupling agent onto silica-coated nanoparticles to form siloxane polymer coating.

6. The inkjet ink composition of claim 1, wherein the functional polymer functions as a stabilizer or a binder or a combination thereof.

7. The inkjet ink composition of claim 1, wherein the colorant is present in an amount from about 0.1% to about 30% by weight, based on the total weight of the inkjet ink composition.

8. The inkjet ink composition of claim 1, wherein the ink solvent is selected from the group consisting of ketones, alcohols, esters, and combinations thereof.

9. The inkjet ink composition of claim 8 wherein the ink solvent comprises a mixture of methyl ethyl ketone, ethyl acetate and ethanol.

10. The inkjet ink composition of claim 1, wherein the ink solvent is present in an amount from about 50% to about 85% by weight, or from about 65% to about 80% by weight, based on the total weight of the inkjet ink composition.

11. The inkjet ink composition of claim 1, wherein the binder is present in an amount from about 0.1% to about 35% by weight, based on the total weight of the inkjet ink composition.

12. The inkjet ink composition of claim 1, wherein the additive is selected from the group consisting of plasticizers, surfactants, light stabilizers, defoaming agents, antioxidants, UV stabilizers, bactericides, conducting agents, rub resistance agents, and combinations thereof.

13. The inkjet ink composition of claim 1, wherein the additive comprises one or more plasticizers for solubilizing the binder.

14. The inkjet ink composition of claim 1, wherein the inkjet ink composition does not flocculate during inkjet printing.

15. A print formed on a first nonporous substrate by the inkjet ink composition of claim 1, the print is not substantially transferred to a second nonporous substrate after the first nonporous substrate and the second nonporous substrate with the print between the first and second nonporous substrates are bundled by wrapping with a polyethylene wrap and then pressed under a load of 500 g at 50° C. for 24 hours.

16. The print of claim 15, wherein the amount of the print transferred from the first nonporous substrate to the second nonporous substrate is less than 1% of the print by weight or area after the first nonporous substrate and the second nonporous substrate with the print between the first and second nonporous substrates are bundled by wrapping with a polyethylene wrap and then pressed under a load of 500 g at 50° C. for 24 hours.

17. The print of claim 15, wherein each of the first nonporous substrate and the second nonporous substrate is independently made of a polymer selected from the group consisting of polyolefins, crosslinked polyolefins, ethylene vinyl acetate copolymers, poly(phenyl ether), chlorinated polymers, styrenic polymers, polyacrylates, polymethacrylates, polycarbonates, epoxy resins, and combinations thereof.

18. The inkjet ink composition of claim 1, wherein the crystal structure of the surface-modified nanoparticles is adjustable to display black, brown, yellow or red color.

19. The inkjet ink composition of claim 1, wherein the average diameter of the surface-modified nanoparticles is less than 30 nm.

20. The inkjet ink composition of claim 1, wherein the average diameter of the surface-modified nanoparticles is about 1 nm to about 20 nm.

21. The inkjet ink composition of claim 1, wherein the cluster of surface-modified nanoparticles is between 3 nm and 150 nm in size or diameter.

22. The inkjet ink composition of claim 1, wherein the superparamagnetic or paramagnetic properties of the surface-modified nanoparticle cluster ensures no magnetic remanence between nanoparticles or nanoparticle clusters or a combination thereof.

23. The inkjet ink composition of claim 1, wherein the surface-modified nanoparticle cluster ensures good print transfer resistance.

24. The inkjet ink composition of claim 1, wherein the amount of the print transferred from the first nonporous substrate to the second nonporous substrate is less than 1% of the print by weight or area after the first nonporous substrate and the second nonporous substrate with the print between the first and second nonporous substrates are bundled by wrapping with a polyethylene wrap and then pressed under a load of 500 g at a temperature of 50° C. for a period of time of 24 hours.

* * * * *